R. B. CALCUTT.
RUBBER CABLE AND TIRE FOR VEHICLES.
APPLICATION FILED OCT. 7, 1907.
916,992.  Patented Apr. 6, 1909.
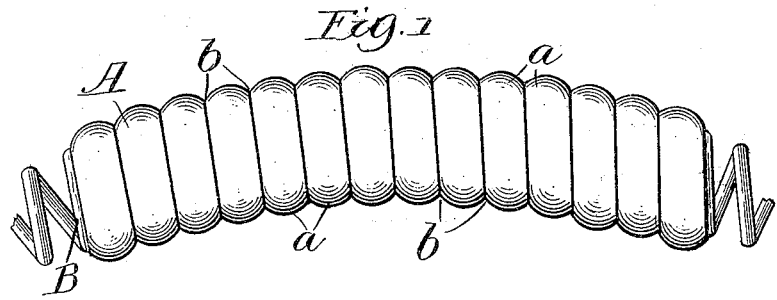
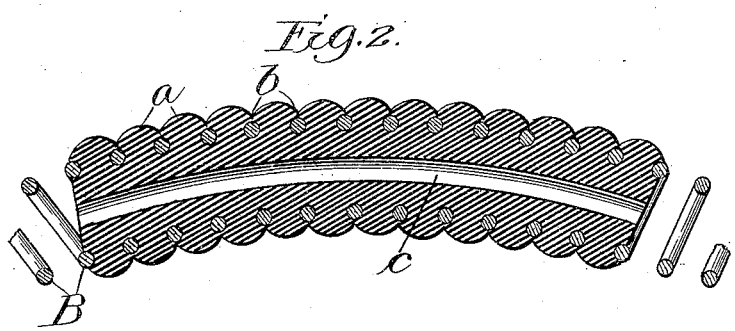
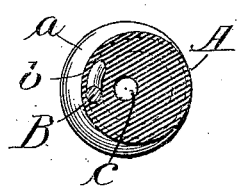
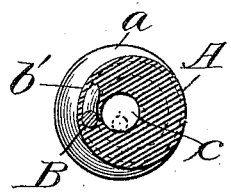
Witnesses:
Inventor:
Reginald B. Calcutt
by Frank D. Thomason
Atty

UNITED STATES PATENT OFFICE.

REGINALD B. CALCUTT, OF AUSTIN, ILLINOIS.

RUBBER CABLE AND TIRE FOR VEHICLES.

No. 916,992.    Specification of Letters Patent.    Patented April 6, 1909.

Application filed October 7, 1907. Serial No. 396,296.

*To all whom it may concern:*

Be it known that I, REGINALD B. CAL-CUTT, a citizen of the United States, and a resident of Austin, in the county of Cook and State of Illinois, have invented certain new and useful Improvements in Rubber Cables and Tires for Vehicles, &c., of which the following is a full, clear, and exact description.
My invention relates more particularly to rubber tires although it can be adapted for other purposes.

The object of my invention is to provide a comparatively inexpensive and very durable rubber cable which, when used as a tire for light vehicles such as baby carriages, velocipedes, and the like, will wear away only to a limited extent and will then not only cease wearing away, but will thereafter run just as noiseless as if made of rubber only. This I accomplish by the means hereinafter fully described, and as more particularly pointed out in the claims.

In the drawings, Figure 1 is a side view of a segment of my improved rubber cable. Fig. 2 is a longitudinal central section of the same. Figs. 3 and 4 are transverse sections therethrough.

In the drawings, A represents a rubber cable of any suitable diameter the circumference of which is provided with a spiral bead $a$, which extends throughout the length of the same. This bead is of such width and its spiral course is such that a continuous spiral groove $b$ is formed in the circumference of said cable. In making this cable an open spiral metal spring or coil of wire B of less diameter than the dip of said groove is embedded or seated in the rubber composition, concentric to the axis of the cable, and each coil of said spring is separated from its neighbors such a distance and is so relatively arranged that it lies just in or beneath the dip of the groove $b$ and follows and parallels the course of said groove throughout its length.

When my invention is used as a tire for vehicles it is secured therein by inserting a wire or filler through the bore $c$ of the same, substantially as shown in dotted lines in Fig. 4 of the drawing (the bore being of any desired diameter), and then securing the ends of said wire or filler together in any suitable manner. As the tire wears the material composing the bead $a$ spreads and fills the grooves $b$ to a certain extent, and at first provides an additional protection to the metal spring. But as it continues to wear it ultimately leaves the coils of the spring more or less exposed. When, however, the tire reaches this stage of its existence the rubber which will thereafter be expressed or crowded out between the coils of the spring will muffle and deaden the noise which would be made by the contact of the metal with the roadway. The reason for this result can be ascribed to the fact that originally the pressure on the beaded portion of the tread of the tire will condense the material of the same to a very great extent, and when the wear thereof has reached the point where the coils of the spring will be more or less exposed, said condensed material will commence to expand in an effort to regain its original elastic consistency. This tendency will of course be facilitated by the depression and consequent retreating of the coils of wire into the rubber material as they come in contact with the road.

I am aware that it is old to corrugate and provide rubber cables with spiral beads and also to provide the same with a spiral coiled wire which was seated in said bead,—in fact over which said bead was formed. The results it is possible to accomplish with such a construction would be entirely different from that accomplished by my invention as hereinbefore explained, because of the absence of this material between the coils of the wire;
the consequent absence of condensed material between the same as the tread of the tire wears away, and because of the fact that the coiled wire when its veneer of rubber wore away would stand out in relief from the core of rubber it surrounds.

What I claim as new is:—

1. A rubber cable having a spiral groove in its circumference, and a spiral metal coil embedded in the dip of said groove.

2. A rubber cable having a bore and provided with a spiral groove in its circumference, and a spiral metal coil embedded in the dip of said groove.

In testimony whereof I have hereunto set my hand and seal this 25th day of September, A. D., 1907.

REGINALD B. CALCUTT. [L. S.]

Witnesses:
FRANK D. THOMASON,
E. K. LUNDY.